United States Patent

Arita

(10) Patent No.: US 6,777,475 B1
(45) Date of Patent: Aug. 17, 2004

(54) RESIN COMPOSITION IMPROVED IN LOW-TEMPERATURE IMPACT RESISTANCE

(75) Inventor: Hiroaki Arita, Himeji (JP)

(73) Assignee: Daicel-Hüls Ltd., Tokyo (JP)

( * ) Notice: Subject to any disclaimer, the term of this patent is extended or adjusted under 35 U.S.C. 154(b) by 0 days.

(21) Appl. No.: 09/869,425

(22) PCT Filed: Oct. 24, 2000

(86) PCT No.: PCT/JP00/07407

§ 371 (c)(1),
(2), (4) Date: Jun. 27, 2001

(87) PCT Pub. No.: WO01/30914

PCT Pub. Date: May 3, 2001

(30) Foreign Application Priority Data

Oct. 28, 1999 (JP) ............................................ 11-306458

(51) Int. Cl.⁷ ................................................. C08K 5/06
(52) U.S. Cl. ....................................... 524/377; 524/376
(58) Field of Search .................................. 524/376, 377

(56) References Cited

U.S. PATENT DOCUMENTS

| | | | | |
|---|---|---|---|---|
| 3,915,912 A | * | 10/1975 | Ishicawa et al. | ............ 524/322 |
| 4,956,423 A | | 9/1990 | Lee | ............. 524/432 |
| 5,716,696 A | * | 2/1998 | Takashige et al. | ........... 428/213 |
| 6,121,384 A | * | 9/2000 | Rajagopalan | ............... 525/221 |

FOREIGN PATENT DOCUMENTS

| | | |
|---|---|---|
| JP | 51125439 | 11/1976 |
| JP | A59219365 | 12/1984 |
| JP | A3139557 | 6/1991 |
| JP | A6329888 | 11/1994 |
| JP | A1112452 | 1/1999 |
| JP | A11181308 | 7/1999 |
| WO | A1-9518179 | 7/1995 |

* cited by examiner

Primary Examiner—James J. Seldleck
Assistant Examiner—U. K Rajguru
(74) Attorney, Agent, or Firm—Birch, Stewart, Kolasch & Birch, LLP.

(57) ABSTRACT

A resin composition of the invention includes a thermoplastic elastomer and a glycol or its derivative. Polyamide- or polyester-based thermoplastic elastomers, for example, can be used as the thermoplastic elastomer. The soft segment of the thermoplastic elastomer may be composed of a polyether or polyester. As the glycol or its derivative, for example, a compound represented by the following Formula (1):

$$R^1O\text{-}(A^1\text{-}O)_l\text{-}(A^2\text{-}O)_m\text{-}(A^3\text{-}O)_n\text{-}R^2 \quad (1)$$

(wherein each of $R^1$ and $R^2$ is, identical to or different from each other, a hydrogen atom, an alkyl group or an acyl group; each of $A^1$, $A^2$ and $A^3$ is, identical to or different from one another, an alkylene group having 2 or more carbon atoms; each of l, m and n is, identical to or different from one another, an integer of 0 or more, where l+m+n>0) can be used. This resin composition can substantially improve impact resistance at low temperatures while maintaining tensile properties, flexural properties and heat resistance properties.

6 Claims, No Drawings

US 6,777,475 B1

RESIN COMPOSITION IMPROVED IN LOW-TEMPERATURE IMPACT RESISTANCE

This application is the national phase under 35 U.S.C. § 371 of PCT International Application No. PCT/JP00/07407 which has an International filing date of Oct. 24, 2000, which designated the United States of America and was not published in English.

TECHNICAL FIELD

The present invention relates to resin compositions, and specifically, it relates to resin compositions which are useful for obtaining various molded articles that require impact resistance at low temperatures, and to molded articles composed of the resin compositions.

BACKGROUND ART

Known methods for increasing impact resistance at low temperatures of molded articles each composed of a thermoplastic resin include a method in which various elastomers (rubber components) are blended with the thermoplastic resin, a method in which a plasticizer is added to the thermoplastic resin, a method in which the aforementioned two methods are combined, and a method in which a thermoplastic elastomer is used.

However, even if any of these improvements is performed, the resulting molded articles have insufficient impact strength at low temperatures in some applications. As a solution to this problem, one skilled in the art uses large amounts of various elastomers or adds a plasticizer to the resin to the limit of compatibility with the resin. However, the use of large amounts of elastomers invites deteriorated characteristics of the resin, such as strengths (e.g., tensile strength and flexural strength), heat resistance and chemical resistance. The addition of large amounts of plasticizers causes bleeding of the plasticizers.

DISCLOSURE OF INVENTION

Accordingly, an object of the present invention is to provide a resin composition which can have substantially improved impact resistance at low temperatures, while maintaining its tensile properties, flexural properties and heat resistance properties, and to provide a molded article composed of the resin composition.

After intensive investigations to achieve the above objects, the present inventors have found that the incorporation of a glycol or its derivative into a thermoplastic elastomer can substantially improve impact resistance of the resulting molded article at low temperatures, without deterioration of the characteristics of the thermoplastic elastomer (e.g., tensile properties, flexural properties and heat resistance properties). The present invention has been accomplished based on these findings.

Specifically, the present invention provides a resin composition including a thermoplastic elastomer and a glycol or its derivative.

In addition, the present invention provides a molded article composed of the aforementioned resin composition.

BEST MODE FOR CARRYING OUT THE INVENTION

A resin composition of the present invention comprises a thermoplastic elastomer and a glycol or its derivative.

Such thermoplastic elastomers include a wide variety of polymers that exhibit properties as rubbers at ordinary temperatures but exhibit thermoplasticity at high temperatures, such as polyamide-based elastomers, polyester-based elastomers, polyurethane-based elastomers, styrenic elastomers, polyolefinic elastomers, and poly(vinyl chloride)-based elastomers.

Of these thermoplastic elastomers, polyamide-based elastomers and polyester-based elastomers, for example, are preferred. Illustrative polyamide-based elastomers are polyether amide block copolymers each having a polyamide component as a hard segment and a polyether component as a soft segment. Such polyamide components constituting the hard segment include, for example, polyamide 6, polyamide 66, polyamide 11, and polyamide 12. Polyether components constituting the soft segment include, for example, polyethylene glycol, polypropylene glycol, and polytetramethylene glycol.

Illustrative polyester-based elastomers are, for example, block copolymers each having a polyester component such as polybutylene terephthalate as a hard segment and a long-chain polyol or polyester component as a soft segment.

Preferred thermoplastic elastomers for use in the present invention include elastomers having a soft segment composed of a polyether or polyester. Each of these thermoplastic elastomers can be used alone or in combination.

The glycol or its derivative includes, for example, a compound represented by the following Formula (1)

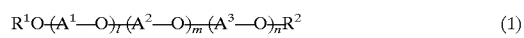

$$R^1O\text{-}(A^1\text{-}O)_l\text{-}(A^2\text{-}O)_m\text{-}(A^3\text{-}O)_n\text{-}R^2 \qquad (1)$$

(wherein each of $R^1$ and $R^2$ is, identical to or different from each other, a hydrogen atom, an alkyl group or an acyl group; each of $A^1$, $A^2$ and $A^3$ is, identical to or different from one another, an alkylene group having 2 or more carbon atoms; each of l, m and n is, identical to or different from one another, an integer of 0 or more, where l+m+n>0.)

Alkyl groups in $R^1$ and $R^2$ include methyl, ethyl, propyl, isopropyl, butyl, isobutyl, s-butyl, t-butyl, pentyl, hexyl, and other alkyl groups each having from about 1 to about 6 carbon atoms. Among them, alkyl groups each having from about 1 to about 4 carbon atoms are preferred, of which methyl group or ethyl group is typically preferred.

Acyl groups in $R^1$ and $R^2$ include, but are not limited to, acetyl, propionyl, butyryl, benzoyl, and other aliphatic, alicyclic or aromatic acyl groups each having from about 2 to about 8 carbon atoms.

At least one of $R^1$ and $R^2$ is preferably a hydrogen atom, and both of $R^1$ and $R^2$ are typically preferably hydrogen atoms.

Alkylene groups each having 2 or more carbon atoms in $A^1$, $A^2$ and $A^3$ include, but are not limited to, ethylene group, propylene group, trimethylene group, tetramethylene group, pentamethylene group, 2,2-dimethyltrimethylene group, hexamethylene group, and other straight- or branched-chain alkylene groups each having from about 2 to about 6 carbon atoms, of which alkylene groups each having from 2 to 4 carbon atoms are preferred.

(l+m+n) is an integer of 1 or more, and is preferably an integer from about 1 to about 30000, more preferably from about 10 to about 5000, and typically preferably from about 20 to about 1000.

Illustrative compounds represented by Formula (1) include, but are not limited to, ethylene glycol, propylene glycol, trimethylene glycol, 1,3-butanediol, tetramethylene glycol, neopentyl glycol, hexanediol, and other alkylene glycols; diethylene glycol, triethylene glycol, polyethylene glycol (hereinafter these may be generically referred to as "polyethylene glycols"), dipropylene glycol, tripropylene glycol, polypropylene glycol (hereinafter these may be generically referred to as "polypropylene glycols"), polytetramethylene glycol, polyoxyethylene polyoxypropylene block copolymers, polypropylene tetramethylene glycol (PPTG) (polyoxypropylene polyoxytetramethylene block copolymers), and other polyalkylene glycols (including copolymers); and monoalkyl ethers, dialkyl ethers, monoacyl derivatives, diacyl derivatives, and monoalkyl ether monoacyl derivatives of these compounds.

Each of these glycols or derivatives thereof can be used alone or in combination. Preferred glycols or derivatives thereof are polyethylene glycols, polypropylene glycols, polypropylene tetramethylene glycol (PPTG), and other polyalkylene glycols (including copolymers). The number average molecular weight of the polyalkylene glycol is, for example, from about 30 to about 1000000, preferably from about 60 to about 100000, and more preferably from about 120 to about 50000.

The amount of the glycol or its derivative in the invented resin composition can be appropriately selected within a range not deteriorating the properties of the thermoplastic elastomer, and is generally from about 0.1 to about 10 parts by weight, preferably from about 0.1 to about 8 parts by weight, and more preferably from about 0.5 to 6 parts by weight, relative to 100 parts by weight of the thermoplastic elastomer. If the amount of the glycol or its derivative is excessively large, this component may bleed out from the resin, or even if all of the component is incorporated into the resin, inherent properties of the thermoplastic elastomer such as strengths and heat resistance may be deteriorated. In contrast, if the amount is excessively small, impact resistance at low temperatures may not be significantly improved.

The invented resin composition may further comprise a plasticizer. Such plasticizers include, but are not limited to, triphenyl phosphate, tricresyl phosphate, tris(isopropylphenyl)phosphate, triethyl phosphate, tributyl phosphate, trioctyl phosphate, tris(β-chloroethyl)phosphate, tris(dichloropropyl)phosphate, tris(butoxyethyl)phosphate, tris(β-chloropropyl)phosphate, octyl diphenyl phosphate, and other phosphoric ester plasticizers; polyester plasticizers, epoxy plasticizers, anhydrous hydrophthalic ester plasticizers; butyl benzyl phthalate, dilauryl phthalate, diheptyl phthalate, dibutyl phthalate, diethyl phthalate, dimethyl phthalate, diisodecyl phthalate, dioctyl phthalate, dicyclohexyl phthalate, dioctyl adipate, diisodecyl adipate, di(butoxyethyl) adipate, di(2-ethylhexyl) azelate, dioctyl sebacate, dibutyl sebacate, acetyl triethyl citrate, di(2-ethylhexyl) maleate, dibutyl maleate, dibutyl fumarate, 2-ethylhexyl p-hydroxybenzoate, and other ester plasticizers; stearic plasticizers; trimellitic plasticizers; benzenesulfonic acid butylamide, and other aromatic sulfonamide plasticizers; plasticizers for rubber; and chlorinated paraffin. Each of these plasticizers can be used alone or in combination depending on the type of the thermoplastic elastomer. For example, when a polyamide-based elastomer is used as the thermoplastic elastomer, 2-ethylhexyl p-hydroxybenzoate, and other benzoic ester plasticizers, and benzenesulfonic acid butylamide and other aromatic sulfonamide plasticizers are preferred.

The amount of the plasticizer depends on the type of thermoplastic elastomer used and desired physical properties such as elastic modulus in bending, and is generally from 1 to 30 parts by weight, and preferably from 5 to 20 parts by weight, relative to 100 parts by weight of the thermoplastic elastomer.

The invented resin composition may further comprise conventional additives within ranges not deteriorating impact resistance at low temperatures. Such additives include, but are not limited to, inorganic fillers, graphite, glass fibers, metallic fibers, complex fibers, gypsum fibers, ceramic fibers, coupling agents, heat stabilizers, weather-resistance stabilizers, mold release agents, lubricants, coloring agents, antistatic agents, flame retardant agents, and foaming agents.

The invented resin composition can be prepared by mixing and melting the thermoplastic elastomer with the glycol or its derivative, and, according to necessity, plasticizers, other resins, and additives. The individual components can be mixed by using conventional mixers, extruders, kneaders, and other kneading machines.

Using the above-prepared resin composition, a molded article having a desired shape can be obtained by a conventional melt molding technique such as compression molding, injection molding or extrusion molding. Illustrative molded articles thus obtained include, for example, shuttlecocks and other sports goods, shoes, tubes, hoses, gears, and other parts for automobiles or machines, and electrical device parts.

Industrial Applicability

The present invention can substantially improve impact resistance at low temperatures without deterioration of the satisfactory physical properties of thermoplastic elastomers, such as tensile properties, flexural properties, and heat resistance properties. This is probably because the glycol or its derivative is incorporated into the soft segment moiety of the thermoplastic elastomer and plays some role to improve impact resistance at low temperatures, whereas details of the reasons are not completely clarified.

EXAMPLES

The present invention will be illustrated in further detail with reference to several examples and a comparative example below, which are not intended to limit the scope of the invention.

Example 1

A total of 100 parts by weight of a polyamide elastomer (produced by Daicel-Huels Ltd., under the trade name of "Daiamide PAE") 0.5 part by weight of an antioxidant (produced by Ciba Specialty Chemicals Corporation, under the trade name of "Irganox 245"), and 2 parts by weight of polypropylene glycol (a reagent produced by Nacalai Tesque, Inc.) were compounded using a biaxial extruder, and the resulting compound was injected and molded at a temperature of 280° C. using an injection molding machine to thereby yield test pieces [a tensile dumbbell (according to ASTM D 638), flexural dumbbell (according to ASTM D 790), and IZOD impact test dumbbell (with notches) (according to ASTM D 256) each according to ASTM specifications].

Example 2

A total of 100 parts by weight of a polyamide elastomer (produced by Daicel-Huels Ltd., under the trade name of "Daiamide PAE"), 0.5 part by weight of an antioxidant (produced by Ciba Specialty Chemicals Corporation, under the trade name of "Irganox 245"), and 2 parts by weight of polyethylene propylene glycol (a reagent produced by Nacalai Tesque, Inc.) were compounded using a biaxial extruder, and the resulting compound was injected and molded at a temperature of 280° C. using an injection molding machine to thereby yield test pieces [a tensile dumbbell (according to ASTM D 638), flexural dumbbell (according to ASTM D 790), and IZOD impact test dumbbell (with notches) (according to ASTM D 256) each according to ASTM specifications].

Comparative Example 1

Test pieces were prepared in the same manner as in Example 1, except that polypropylene glycol was not added.

Evaluation Test

Tensile properties at 23° C.×50% RH (according to ASTM D 638), flexural properties (according to ASTM D 790), and IZOD impact strength at 23° C., 0° C., −20° C., and −40° C. (according to ASTM D 256) of the test pieces obtained in the examples and comparative example were determined. The results are shown in Table 1.

TABLE 1

|  | Temperature | Unit | Example 1 | Example 2 | Comp. Ex. 1 |
|---|---|---|---|---|---|
| Tensile strength at yield | 23° C. | MPa | 21 | 21 | 21 |
| Tensile strength at break | 23° C. | MPa | 37 | 37 | 37 |
| Tensile elongation at break | 23° C. | % | 300 | 300 | 300 |
| Flexural strength | 23° C. | MPa | 15 | 15 | 15 |
| Elastic modulus in bending | 23° C. | MPa | 290 | 290 | 290 |
| IZOD impact strength | 23° C. | J/m | not broken | not broken | not broken |
|  | 0° C. | J/m | not broken | not broken | not broken |
|  | −20° C. | J/m | not broken | not broken | 250 |
|  | −40° C. | J/m | 250 | 190 | 70 |

What is claimed is:

1. A resin composition comprising a polyether amide block copolymer as a thermoplastic elastomer and from 0.1 to 10 parts by weight, relative to 100 parts by weight of the elastomer, of a glycol or its derivative.

2. The resin composition according to claim 1, wherein said glycol or its derivative is a compound represented by the following Formula (1):

$$R^1O-(-A^1-O-)_l-(A^2-O-)_m-(-A^3-O-)_n-R^2 \quad (1)$$

wherein each of $R_1$ and $R^2$ is, identical to or different from each other, a hydrogen atom, an alkyl group, or an acyl group; each of $A^1$, $A^2$ and $A^3$ is, identical to or different from one another, an alkylene group having 2 or more carbon atoms; each of l, m and n is, identical to or different from one another, an integer of 0 or more, where l+m+n>0.

3. The resin composition according to claim 1, wherein the amount of the glycol or its derivative is from about 0.5 to 6 parts by weight relative to 100 parts by weight of the thermoplastic elastomer.

4. A molded article composed of a resin composition according to claim 1.

5. The block copolymer resin composition according to claim 1, wherein the polyamide blocks are selected from the group consisting of polyamide 6, polyamide 66, polyamide 11, and polyamide 12 and the polyether blocks are selected from the group consisting of polyethylene glycol, polypropylene glycol, and polytetramethylene glycol.

6. The block copolymer resin composition according to claim 1, wherein the glycol or its derivative are selected from the group consisting of polypropylene glycols, polytetramethylene glycol, polyoxyethylene polyoxypropylene block copolymers, polypropylene tetramethylene glycol, and their derivatives.

* * * * *